(12) United States Patent
Gschwind et al.

(10) Patent No.: US 8,132,169 B2
(45) Date of Patent: Mar. 6, 2012

(54) SYSTEM AND METHOD FOR DYNAMICALLY PARTITIONING AN APPLICATION ACROSS MULTIPLE PROCESSING ELEMENTS IN A HETEROGENEOUS PROCESSING ENVIRONMENT

(75) Inventors: Michael Karl Gschwind, Chappaqua, NY (US); John Kevin Patrick O'Brien, South Salem, NY (US); Kathryn O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1628 days.

(21) Appl. No.: 11/459,154

(22) Filed: Jul. 21, 2006

(65) Prior Publication Data
US 2008/0022278 A1    Jan. 24, 2008

(51) Int. Cl.
*G06F 9/46* (2006.01)
(52) U.S. Cl. ........ 718/100; 718/101; 718/102; 718/104; 718/106
(58) Field of Classification Search .................. 718/100, 718/101, 102, 104, 105, 108
See application file for complete search history.

(56) References Cited

U.S. PATENT DOCUMENTS

| | | | | |
|---|---|---|---|---|
| 6,513,057 B1 * | 1/2003 | McCrory | ...... | 718/102 |
| 7,082,463 B1 * | 7/2006 | Bradley et al. | ...... | 709/223 |
| 7,093,147 B2 * | 8/2006 | Farkas et al. | ...... | 713/320 |
| 7,103,881 B2 * | 9/2006 | Stone | ...... | 717/148 |
| 7,146,607 B2 * | 12/2006 | Nair et al. | ...... | 717/151 |
| 7,444,632 B2 * | 10/2008 | Minor et al. | ...... | 718/100 |
| 7,461,275 B2 * | 12/2008 | Belmont et al. | ...... | 713/300 |
| 2004/0098718 A1 * | 5/2004 | Yoshii et al. | ...... | 718/100 |
| 2005/0081181 A1 * | 4/2005 | Brokenshire et al. | ...... | 717/100 |
| 2008/0216073 A1 * | 9/2008 | Yates et al. | ...... | 718/100 |

* cited by examiner

*Primary Examiner* — Emerson Puente
*Assistant Examiner* — Willy W Huaracha
(74) *Attorney, Agent, or Firm* — Van Leeuwen & Van Leeuwen; Matthew B. Talpis

(57) ABSTRACT

A system and method for dividing an application into a number of logical program partitions is presented. Each of these logical program partitions are stored in a logical program package along with a execution monitor. The execution monitor runs in one of the processing environments of a heterogeneous processing environment. The logical program partition includes sets of object code for executing on each of the types of processors included in the heterogeneous processing environment. The logical program partition includes instrumentation data used to evaluate the performance of a currently executing partition. The execution monitor compares the instrumentation data to the gathered profile data. If the execution monitor determines that the partition is performing poorly then the code for the other environment is retrieved from the logical program package and loaded and executed on the other environment.

16 Claims, 8 Drawing Sheets

SYSTEM AND METHOD FOR DYNAMICALLY PARTITIONING AN APPLICATION ACROSS MULTIPLE PROCESSING ELEMENTS IN A HETEROGENEOUS PROCESSING ENVIRONMENT

BACKGROUND OF THE INVENTION

1. Technical Field

The present invention relates in general to a system and method for dynamically partitioning an application across processing elements in a heterogeneous processing environment. More particularly, the present invention relates to a system and method that determine when a process should run on a particular processing environment and transfers a process from one processing environment to another.

2. Description of the Related Art

Computing systems comprising a multiplicity of heterogeneous processors are becoming increasingly popular. In these environments, one or more general purpose processors work in conjunction with one or more special purpose processors. Typically, since they have different characteristics, the general purpose processors use a different instruction set architecture (ISA) than those used by the special purpose or application specific processors. Having different processing characteristics and ISAs lends each processor type to efficiently performing different types of tasks.

Because of the different characteristics of the processors, this heterogeneous environment is attractive to a variety of environments, such as multimedia, gaming, and numeric intensive application environments. In this environment, a program can have multiple threads. Some of these threads can execute on the general purpose processors and other threads can execute on the special purpose processors. A challenge, however, is that resource availability is not often known until an application is running. Therefore, it is often difficult to predetermine which environment should execute a particular thread, or "partition." If the programmer hard codes various partitions to execute on the special purpose processors and the availability of the special purpose processors is constrained, then program performance may be impacted. Conversely, if the programmer hard codes partitions to execute on the general purpose processor, this processor may be over utilized and perform poorly.

What is needed, therefore, is a system and method that dynamically partitions an application between general purpose processors and special purpose processors. Furthermore, what is needed is a system and method that monitors the application's performance and dynamically re-partitions the application based on predefined criteria, or metrics.

SUMMARY

It has been discovered that the aforementioned challenges are resolved using a system and method that statically divides an application into a number of logical program partitions. A logical program partition contains multiple versions of object code designed to run on one or more general purpose processors and application specific processors or accelerators. Each of these logical program partitions is stored in a logical program package along with a single software routine called an execution monitor. When the application is initially invoked, the execution monitor runs in one of the processing environments. For purposes of this disclosure we assume the monitor runs in the general purpose processor (herein referred to as the Primary processing element or PPE), but one could envision that it could sometimes run in one of the other environments, i.e. on one of the special purpose processors. One example of a application specific processor, or accelerator, is an SPE (synergistic processing element).

The logical program partition includes pre instrumented object code which can be executed on the PPE and pre-instrumented object code which can be executed on the SPE. In addition, the logical program partition includes acceptable performance threshold data used to evaluate the performance of a currently executing partition. This acceptable performance threshold data may be supplied by previously running the code with profile directed feedback enabled, using a typical data set as input. When the application starts, the binary representation (object code) of either the PPE code or the SPE code is initially executed. The binary representation as mentioned previously has been instrumented to include profiling instructions that gather performance related data and can be tailored to the type of operations being performed in the partition. The execution monitor compares the provided performance threshold data to the profile data obtained by execution of the instrumented object code. The types of performance data gathered may pertain to execution performance such as branch misprediction penalty, alignment, cache misses, or power consumption. If, based on the comparison, the execution monitor determines that the partition is performing poorly and should be partitioned to the other processing environment (e.g., moved from the PPE to the SPE), then the code for the other environment is retrieved from the logical program package and loaded on the other environment. The partition running on the first processing environment (i.e., the PPE) runs transfer code to transfer variable and pointer values from the first processing environment (i.e., the PPE) to the second processing environment (i.e., the SPE). The partition loaded on the second processing environment is then started (with the appropriate variables and pointers established) and the partition on the first processing environment is terminated. In addition, the resources (e.g., memory) formerly used by the partition that was running on the first processing environment can be reclaimed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 6:
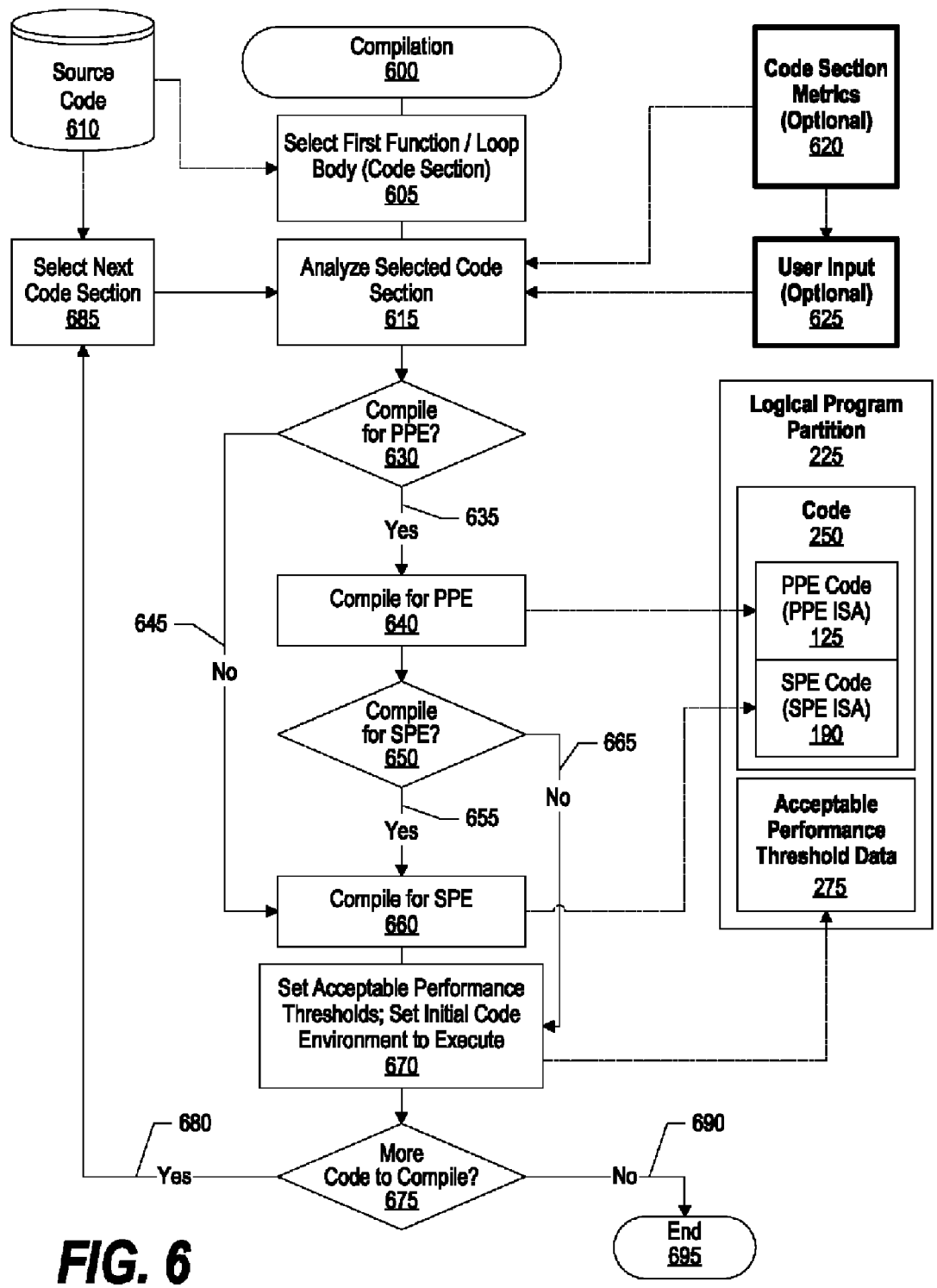
FIG. 6 is a flowchart showing the steps taken to compile functions and loop bodies to create the logical program partitions.

The logical program partitions containing among other things, the multiple versions of the binary representations that were created at compile time. The compiler determines, either automatically or under user direction, that certain functions or loop bodies should be executed on one or other of the application specific processors. The compiler is also responsible for inserting the necessary instrumentation into the object codes. Additionally, the compiler ensures that the multiple versions are compiled with the necessary code and data transfer commands to ensure correct execution across the multiple accelerator processors without direct access to main system memory. FIG. 6 and the corresponding details describe the compilation and creation of the logical partitions discussed herein.

Figure 1:
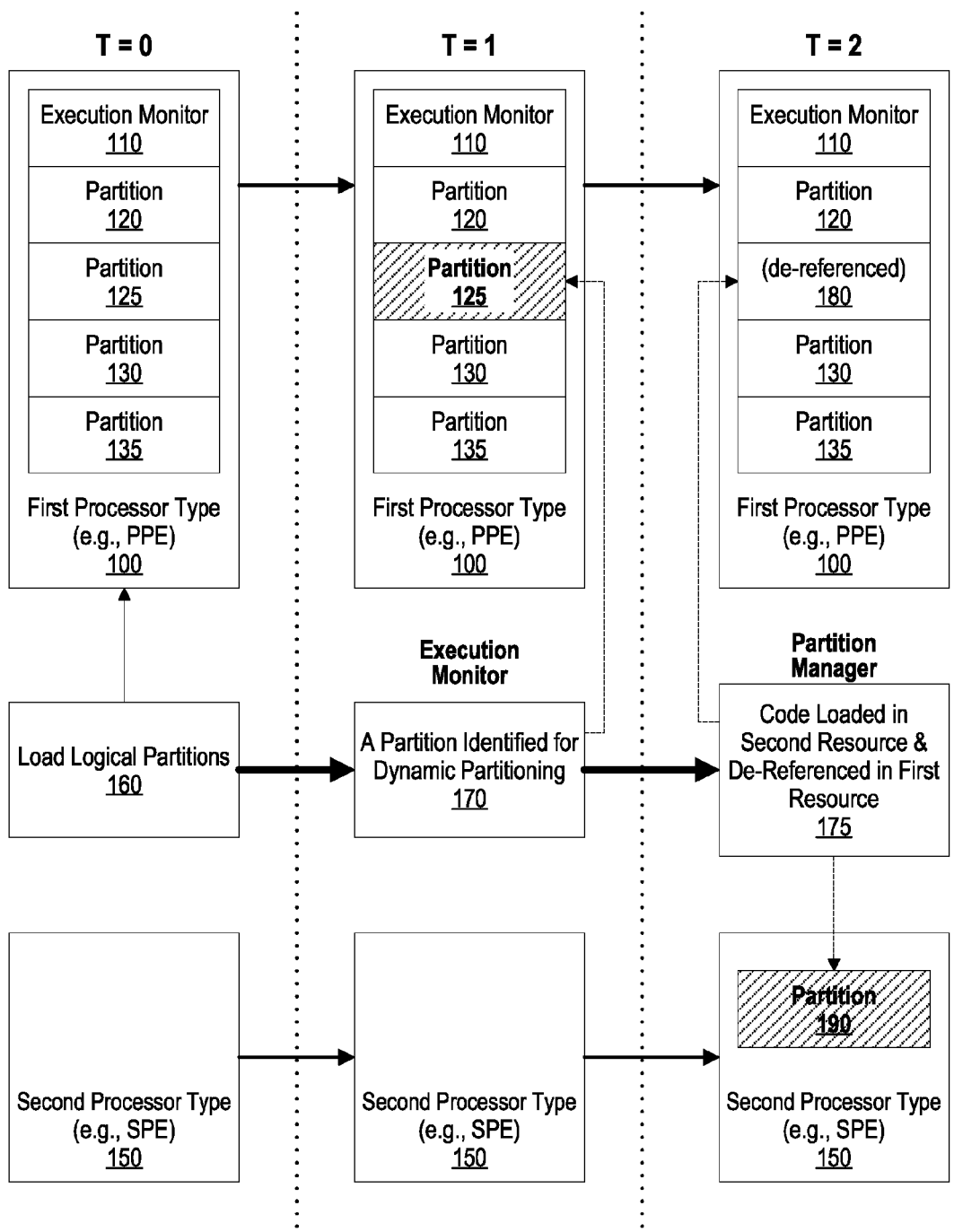
FIG. 1 is a time-based diagram showing the transfer of a partition from a first processing environment to a second processing environment.
Figure 8:
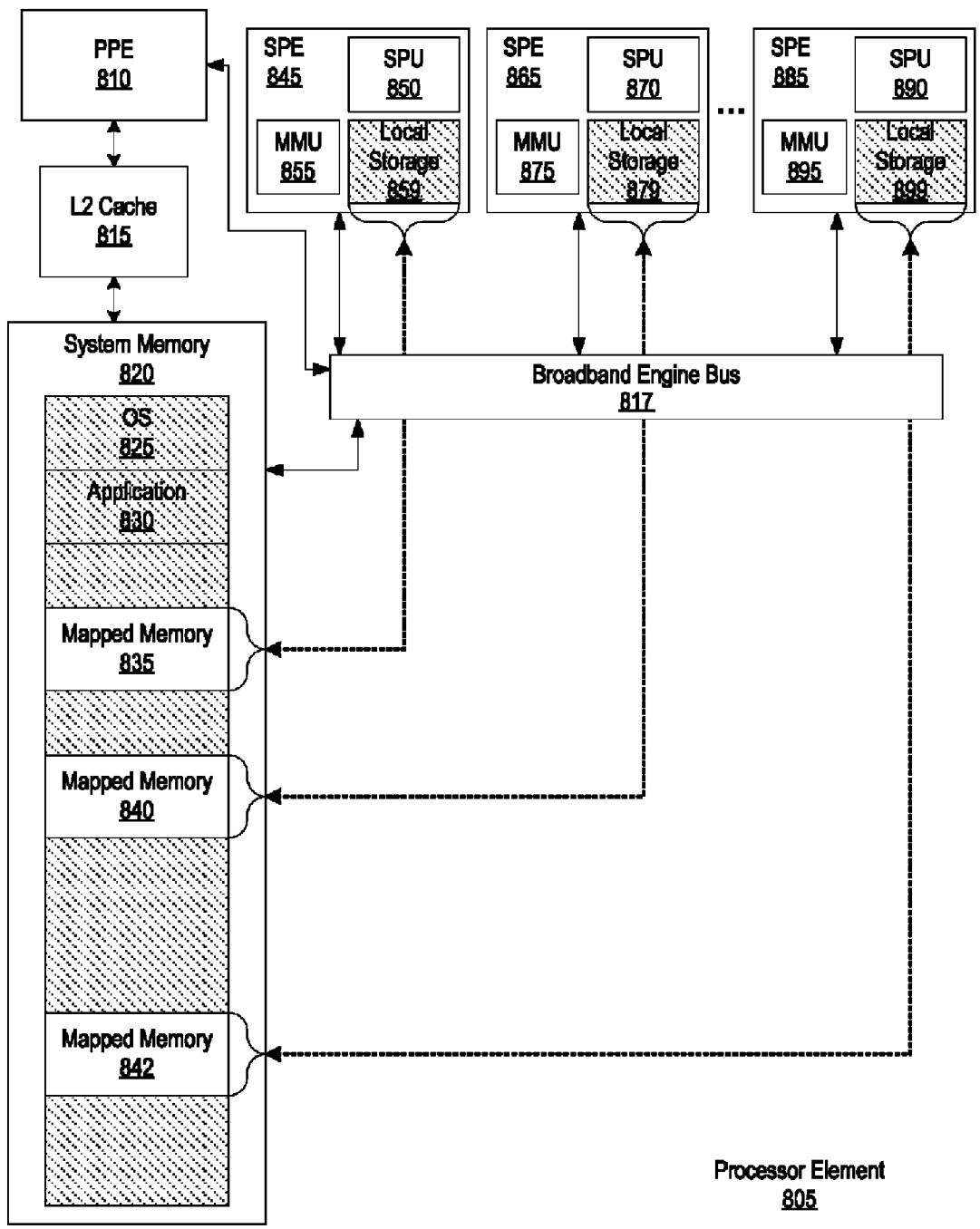
FIG. 8 is a block diagram of a broadband engine that includes a plurality of heterogeneous processors in which the present invention can be implemented.

FIG. 1 is a time-based diagram showing the transfer of a partition from a first processing environment to a second processing environment. At Time=0, the statically partitioned program package is shown executing on first resource 100. For example, the first resource could be the primary processing element (PPE) shown in FIG. 8. While, for simplicity, all of the partitions in FIG. 1 are shown initially running on the same type of processor, the program could also initially execute some of the partitions on a second processor type, such as a Synergistic Processing Element (SPE 150). This may be especially true in the case where some partitions are better suited to run on the SPE due to the performance characteristics and abilities of the SPE. In the example shown, however, when processing commences, the statically partitioned program package is shown being loaded (step 160). In this example, first processor type 100 is shown initially executing execution monitor 110 and partitions 120, 125, 130, and 135. On the other hand, second processor type 150 (e.g., the SPE) is shown executing none of the partitions. As will be more fully explained in FIG. 8, first processor type 100 (the PPE) is a general purpose processor that utilizes a first instruction set architecture (ISA) while second processor type 150 are application specific processors utilizing one or more second instruction set architectures (ISAs) that are different from the PPE's ISA. Also shown in FIG. 8 is that in one embodiment there are several SPEs (e.g., 8 or 16) and a single PPE in one processor element. These SPEs and PPE share memory through a broadband engine bus.

Returning to FIG. 1, at Time=1 (step 170), the execution monitor identifies a particular partition for dynamic partitioning. In the example, partition 125 has been identified. As will be explained in further detail, the identification of a partition for dynamic partitioning indicates that the identified partition is likely better suited for execution on the second processor type. In other words, when the execution monitor identifies partition 125, it is likely that if partition 125 is executed on the SPE instead of the PPE, performance will improve. Likewise, if a partition is currently being executed on one of the SPEs, the execution monitor may determine that performance is likely to improve if the partition is executed on the PPE instead of the SPE.

At step 175, (at Time=2) the partition manager loads code to perform partition 125 onto the second resource (one of the SPEs) and the memory used to execute partition 125 on the PPE is released (de-referenced memory 180). The partition manager is used to effect the transfer to the second processing environment by switching to the appropriate object code in the main processing environment. Because the instruction set used by first resource 100 is different than the instruction set used by second resource 150, the actual executable code (binary representations) and data access instructions is different between the two environments. In addition, the PPE and SPEs share a memory where the SPEs use Direct Memory Access (DMA) commands to read and write to the shared memory, while the PPE uses load and store commands to read and write to the shared memory. In other words, the binary representation (e.g., object code) used in partition 125 is different from the binary representation used in partition 190. However, because both partition 125 and partition 190 perform the same logical operations, they are in essence, interchangeable, so long as they are executed on the appropriate platform. For example, suppose the "logical program partition" performs a complex mathematical operation. The logical program partition then includes two program partitions—a first program partition that has a binary representation (object code) to perform the mathematical operation on the first processor type (e.g., the PPE), also called general purpose processors, and a second program partition that has a binary representation (object code) to perform the mathematical operation on the second processor type (e.g., the SPE), also called application specific processors.

Figure 2:
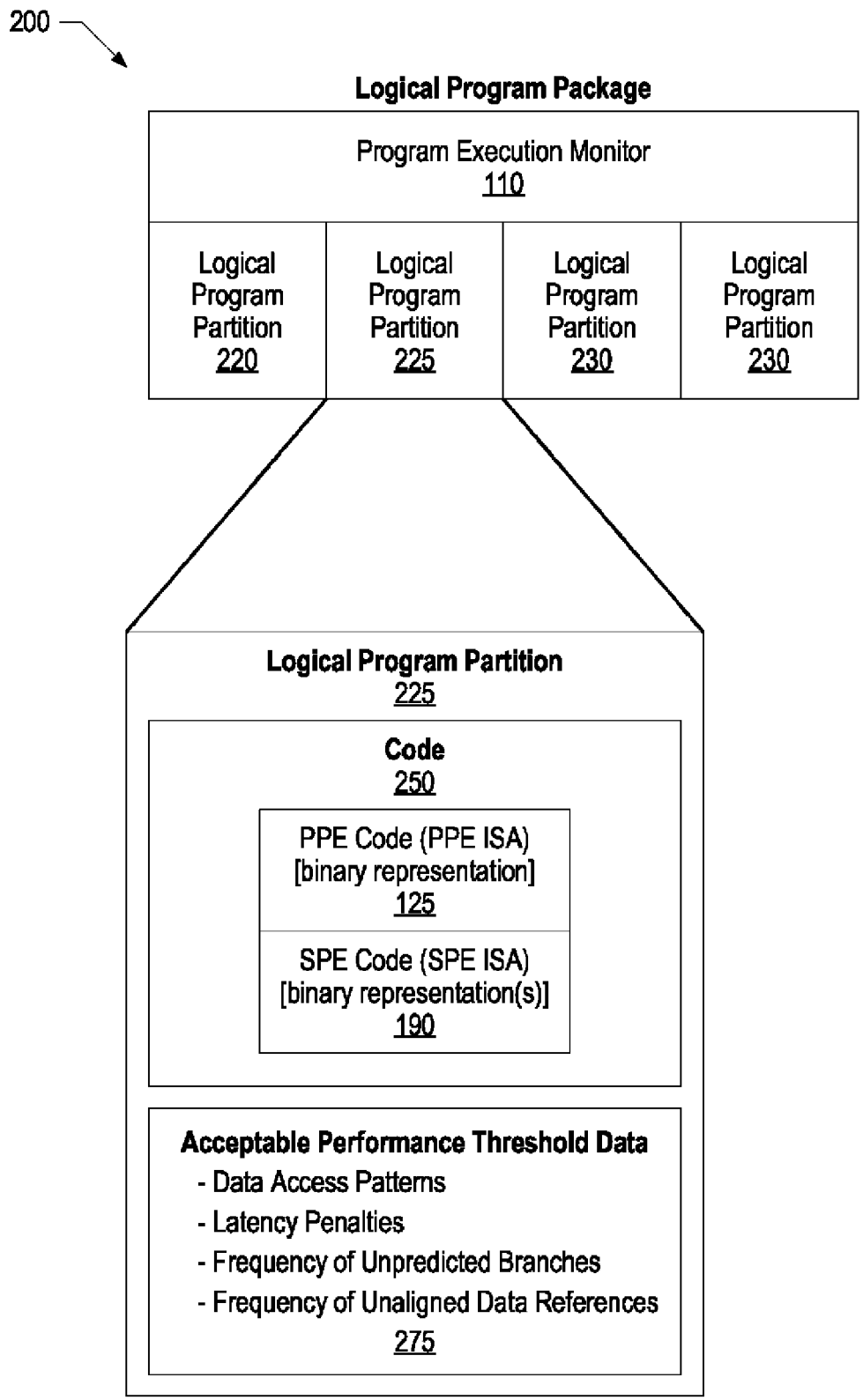
FIG. 2 is a diagram showing details of the contents of a logical program package.

FIG. 2 is a diagram showing details of the contents of a logical program package. In the example shown in FIG. 2, logical program package 200 includes execution monitor 110 and four logical program partitions. A logical program partition is a grouping of multiple compiled versions of a program segment, each targetting one or more of the application specific accelerators. Each of the logical program partitions corresponds to one of the program partitions shown running on the PPE in FIG. 1. In other words, logical program partition 220 includes program partition 120 (shown in FIG. 1) that includes object code (a binary representation) that runs on the first processing environment, logical program partition 225 corresponds to program partitions 125 and 190, logical program partition 230 corresponds to program partition 130, and logical program partition 235 corresponds to program partition 135.

The details of one of the logical program partitions (logical program partition 225) is shown as including object code 250 and acceptable performance threshold data 275. Threshold data 275 is application specific behavior data that may be gathered be using prior runs of the code with typical training data. Code section 250 includes partition 125 that is created using object code (a binary representation) adapted to execute on the PPE and partition 190 that is created using object code (binary representations) adapted to execute on one of the SPEs. Acceptable performance threshold data 275 described above, is used to evaluate how well a given program partition is executing. Those skilled in the art will recognize instrumentation data such as data access patterns, latency penalties, frequency of unpredicted branches, and frequency of unaligned data references can be used to make this evaluation.

The code (either or both partition 125 and/or partition 190) has been instrumented to monitor its execution behavior. The execution monitor then compares the profile data resulting from running the partition (either partition 125 or partition 190) to the instrumentation data that has been prepared for the partition. If the comparison reveals that the logical program partition (e.g., the code used to compute the complex mathematical operation) would likely run better in the other environment, the execution monitor takes steps to run the logical program partition in the other environment.

Referring back to the example introduced in FIG. 1, the execution monitor (110) compares the profile data resulting from the execution of the PPE code (partition 125) to instrumentation data 275. When the comparison reveals that the logical program partition would likely better operate in the other environment (i.e., the mathematical operation would be better performed by SPE code (partition 190) running on one of the SPEs), then the partition manager switches to execute the SPE code (partition 190) by switching to another version of partition 125 which contains the code to load the SPE partition 190. SPE partition 190 has been pre-compiled to include the necessary data transfer commands to effect the transfer of any data needed by partition 190.

The steps outlined in FIG. 1 describe a process whereby the multiple versions of instrumented objects are produced in advance at compile time (see FIG. 6 and corresponding text for compilation details). In another embodiment, these pre-compiled versions could also contain un-instrumented object code which could be used, once the partitions are executing at peak performance on the appropriate accelerator processor. A further embodiment consists of creating the application specific objects at execution time when the execution monitor determines that that a given instruction sequence would perform better on an accelerator with another ISA. This technique would be useful when moving an application between systems with differing accelerator configurations. This techniques could further be applied when loading vendor supplied libraries that have not been tailored to the given heterogeneous environment.

Figure 3:
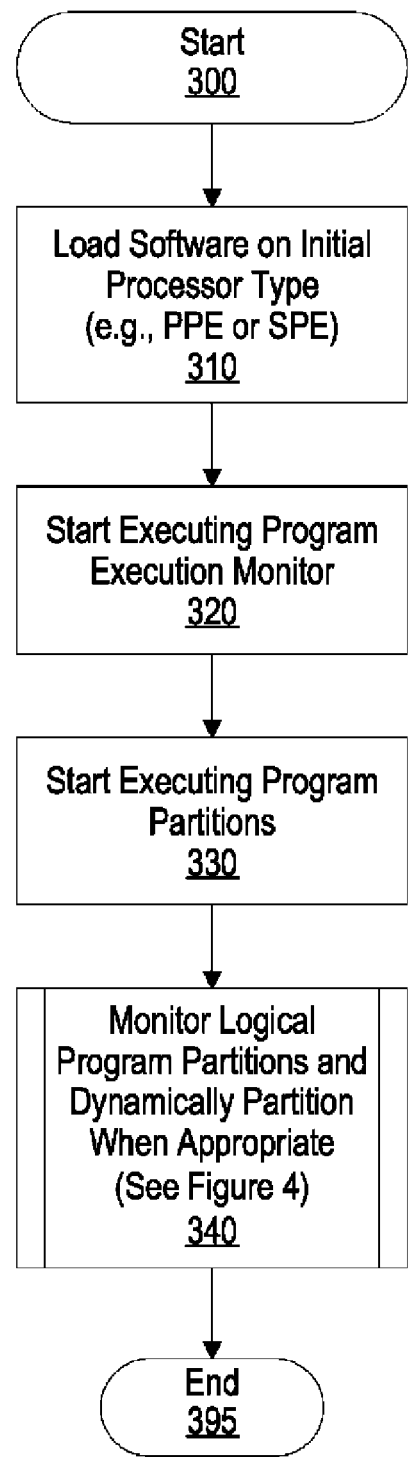
FIG. 3 is a high level flowchart showing the execution of the execution monitor and other program partitions.

FIG. 3 is a high level flowchart showing the execution of the execution monitor and other program partitions. Processing commences at 300 whereupon, at step 310, the partitions commence executing on an initial processor type. For example, one program may initially have all of the partitions commence execution on the PPE (such as the example introduced in FIG. 1), while another program may have some partitions executing on the PPE and other partitions executing on the SPEs. Finally, a program may initialize to execute all of its partitions on the SPEs.

At step 320, the execution monitor commences execution. At step 330, the program partitions loaded on the SPE or the PPE commence executing. The execution monitor then monitors execution of one or more of the program partitions and dynamically partitions the logical program partition to the other processor type when appropriate by comparing profile data resulting from executing the partitions to instrumentation data that corresponds to the partitions (predefined process 340, see FIG. 4 and corresponding text for processing details). When the program finishes, processing ends at 395.

Figure 4:
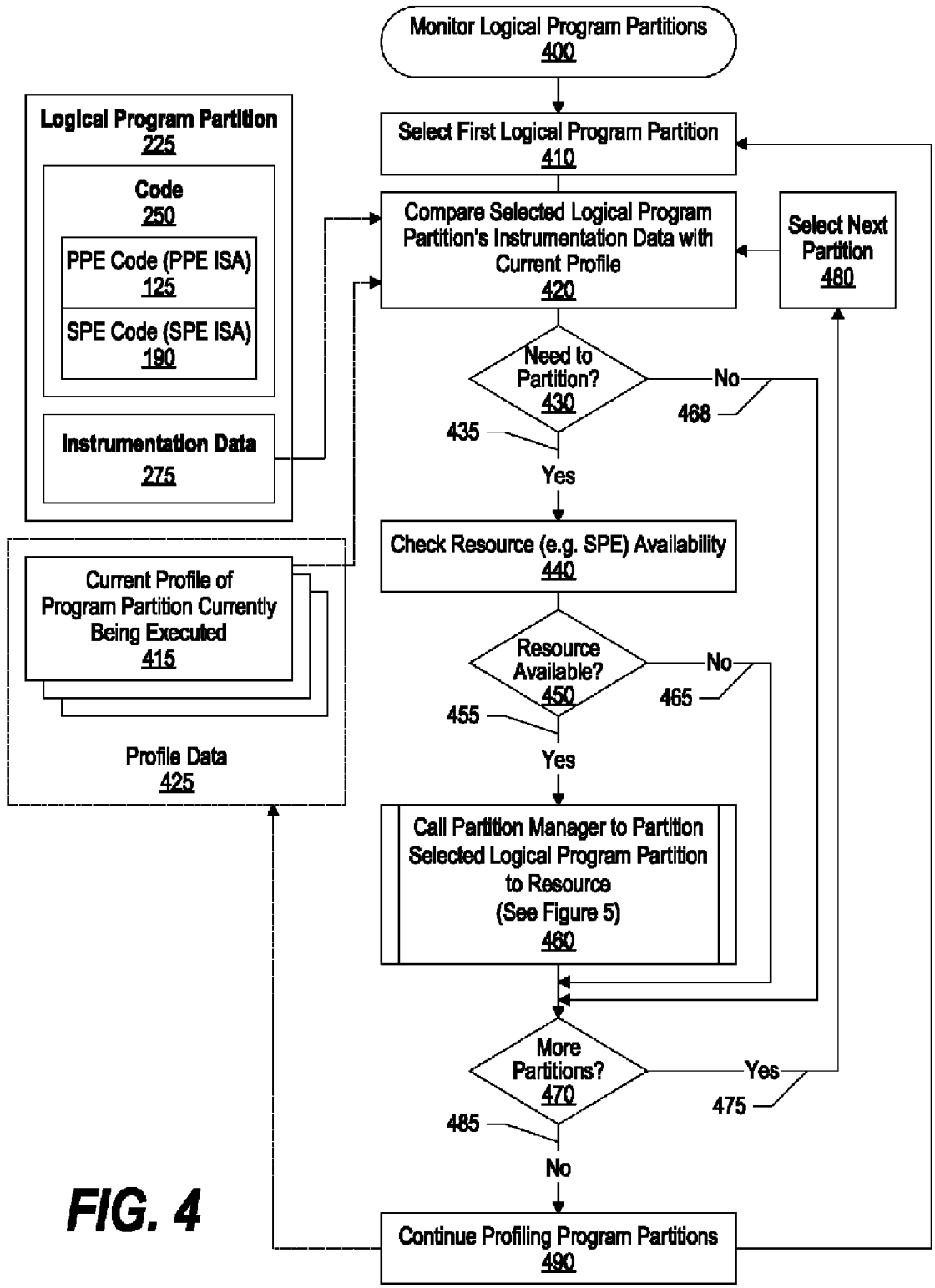
FIG. 4 is a flowchart showing the steps taken to monitor program partitions.

FIG. 4 is a flowchart showing the steps taken to monitor program partitions. Processing commences at 400 whereupon, at step 410, the first logical program partition is selected. As shown in FIG. 2 and explained in the corresponding text, the logical program partition includes, in addition to multiple versions of he binaries tarhetting the application specific processors, instrumentation data 275 that is used to compare with profile data gathered during the execution of a program partition. This comparison is performed at step 420 with the program monitor comparing instrumentation data 275 to current profile data 415 that has been gathered for this particular program partition. As can be seen, there can be several profiles stored in profile data 425 with each profile corresponding to a different program partition that is running on one of the processors (i.e., on either the PPE or on one of the SPEs). A determination is made based on this comparison as to whether the selected logical program partition should be repartitioned (decision 430). Repartitioning the selected logical program partition involves switching execution to the code that performs the logical program partition on another type of processor and stopping the execution of the program partition where it was running. In other words, if a program partition is running on the PPE is to be repartitioned to one of the SPEs, then the code running on the PPE is stopped and code that performs the logical program partition is loaded and executed on one of the SPEs.

If the selected partition needs to be repartitioned, decision 430 branches to "yes" branch 435 whereupon, at step 440, a resource availability check is made to determine if the needed resource (i.e., a SPE) is available. A determination is made as to whether the needed resource is available (decision 450). If the needed resource is available, decision 450 branches to "yes" branch 455 whereupon, at predefined process 460, the partition manager repartitions the selected logical program partition onto the resource (e.g., loaded and executed on the SPE, see FIG. 5 and corresponding text for processing details). Returning to decision 450, if the resource is unavailable, for example no SPEs are available, then decision 450 branches to "no" branch 465 bypassing predefined process 460. Returning to decision 430, if the comparison of the instrumentation data to the gathered profile data determines that there is no need to repartition the logical program partition, then decision 430 branches to "no" branch 468 which bypasses steps 440 through 460.

The execution monitor runs continuously, so long as there is at least one partition generating execution profile data. The execution monitor is responsible for invoking the partition manager to effect the transfer of control between partitions. Some partitions may perform adequately on the general purpose processor (PPE) thus freeing up resources among the accelerator processors (SPEs). The execution monitor may be programmed make such scheduling decisions. After the selected logical program partition has been processed, a determination is made as to whether there are more partitions to evaluate (decision 470). If there are more partitions to evaluate, decision 470 branches to "yes" branch 475 whereupon, at step 480, the next logical program partition is selected and processing loops back to compare and evaluate the newly selected logical program partition. This looping continues until all logical program partitions have been evaluated, at which time decision 470 branches to "no" branch 485. Throughout the process, the system continues profiling program partitions (step 490) and updating the profile data stored in profile data 425.

Processing repeatedly loops through the logical program partitions to compare the instrumentation data to the profile data and determine whether a particular logical program partition needs to be repartitioned. For example, a particular partition may perform within expected parameters set forth in the instrumentation data for a period of time before it starts to perform poorly. When the partition starts performing poorly, the poor performance will be reflected in the partition's profile data (415). In this manner, the execution monitor can leave the partition executing on a first processing environment for a period of time until the partition's performance degrades, at which time the execution monitor can repartition the logical program partition to a second processing environment.

Figure 5:
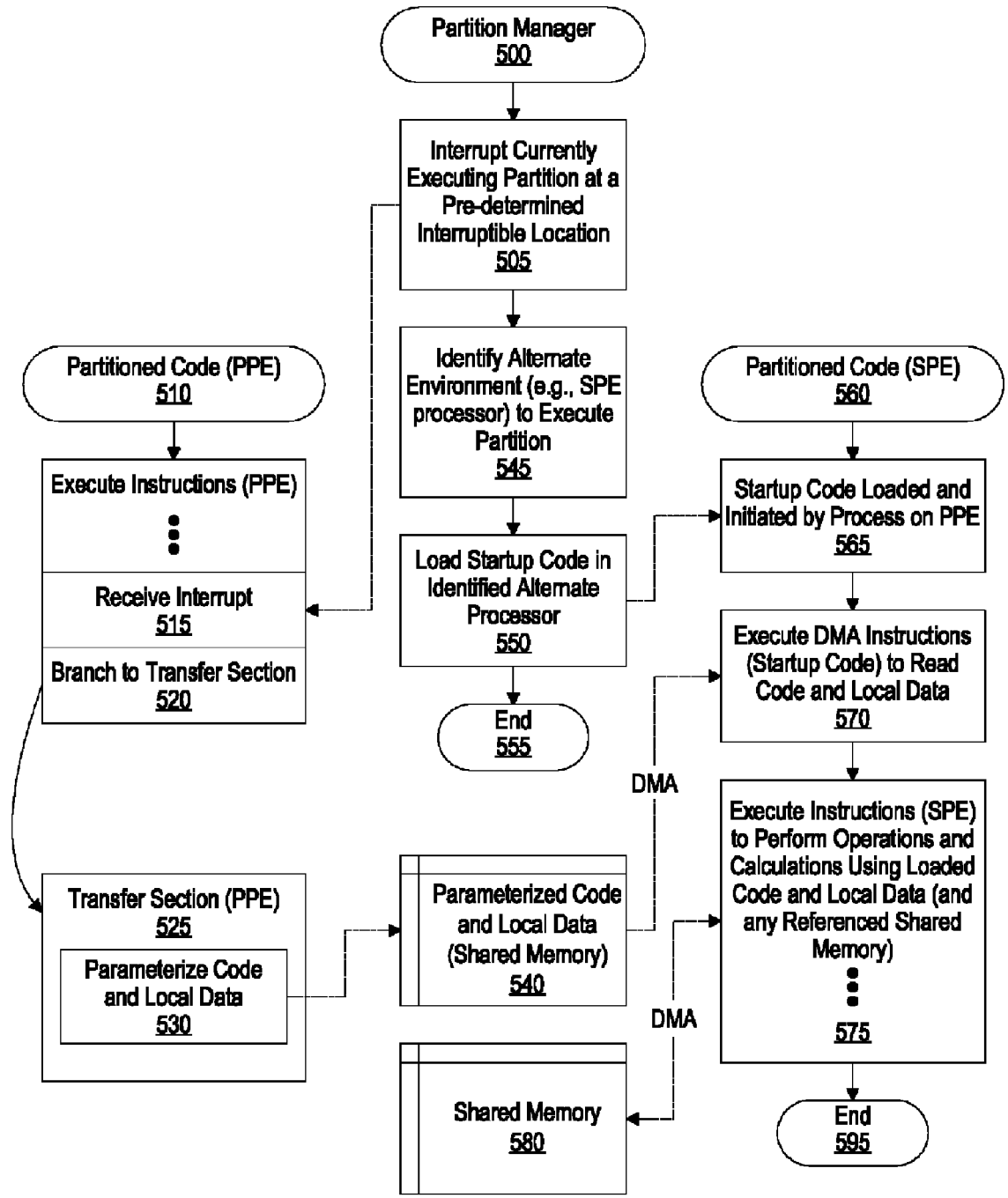
FIG. 5 is a flowchart showing the steps taken to transfer a logical program partition from a first processor type to a second processor type.

FIG. 5 is a flowchart showing the steps taken to transfer a logical program partition from a first processor type to a second processor type. The partition manager is called when an execution monitor determines that a portioned should be repartitioned from one processing environment to another processing environment (e.g., from a general purpose processor such as a PPE to an application specific processor such as an SPE). Processing of the partition manager commences at 500 whereupon, at step 505, the partition manager interrupts a currently running partition at a predetermined interruptible location. In one embodiment, instructions are inserted in specific locations to query for interrupts. In one embodiment, the compiler determines at which points it is safe to to quiesce execution on one processor and switch to another. Locations where interrupting would be safe could be, for example, at procedure boundaries, loop exits or other such places where data can be reconciled between the processors. The currently running partition (510), such as a partition running on a PPE, is executing instructions when, at step 515, it receives the interrupt at a predetermined location. At step 520, the received interrupt signals the currently running partition to branch to transfer section 525. In the transfer section, at step 530, code is executed that parameterizes code and local data and stores the parameterized code and data in shared memory 540.

Returning to partition manager processing, at step 545 the partition manager identifies an alternate environment, such as one of the SPEs, to execute the partition. After the alternate environment has been identified, at step 550, the partition manager initializes the alternate environment, such as one of the SPEs, by loading startup code in the identified processor (e.g., one of the SPEs) that will read the parameterized local code and data generated by the transfer section of the currently running partition. In one embodiment, the code that is about to be run in the alternate environment has not yet been compiled for the alternate embodiment. In this embodiment, source code would be read from the logical program partitioned and the appropriate binary representation would be created on the fly (e.g., using a JIT compiler) running on a separate thread in the general purpose processor, and the resulting binary representation would be loaded in the alternate environment. The address of the parameterized code and local data can be communicated in a variety of ways. For example, the transfer section could send a return code or signal to the partition manager signaling that the parameterized code and local data has been stored along with the address of the memory where the parameterized data was stored. The partition manager would then pass the address along to the alternate environment when loading the startup code. Partition manager processing would then end at 555.

The alternate environment (e.g., SPE) partitioned code would commence at 560 after being initialized by another process, such as the partition manager. At step 565, the alternate environment executes startup code that was loaded by another process. During startup processing, at step 570, the alternate environment uses direct memory access (DMA) commands to read the parameterized code and local data from shared memory area 540 (the parameterized data having been generated and stored by the transfer section of the partition running on the other environment (e.g., on the PPE). At this point, the alternate environment has the local data and the code used to process the data. At step 575, the alternate environment executes instructions included in the code to perform operations, such as calculations, using the loaded code and the local data, including any data stored in shared memory (580) referenced by the local data (e.g., local data pointers to shared memory). Processing of the code and data continues in the alternate environment until processing ends at 595 or until the partition manager interrupts the alternate environment in order to repartition the execution of the partition back on the original environment (e.g., repartitions the partition to execute back on the PPE).

FIG. 6 is a flowchart showing the steps taken to compile functions and loop bodies to create the logical program partitions. Processing commences at 600 whereupon, at step 605, the compiler selects the first function or loop body from source code 610. A function or loop body is referred to herein as a "code section." At step 615, the selected code section is analyzed using pre-established code section metrics 620 and/or using user input 625, such as input from an experienced programmer. In one embodiment, the code section metrics are metrics gathered by code profilers running the code in various environments. After the selected code section has been analyzed, a determination is made as to whether to compile the selected code section for the first environment, such as the PPE (decision 630). If the code section is compiled for the first environment, decision 630 branches to "yes" branch 635 whereupon, at step 640, the selected code section is compiled for the first environment and the resulting compiled code is stored (PPE Code 125) in code section 250 of logical program partition 225. Another determination is made, based upon the analysis of the selected code section, as to whether to compile the selected code section for the second environment (decision 650). If the code section is compiled for the second environment, decision 650 branches to "yes" branch 655 whereupon, at step 660, the selected code section is compiled for the second environment and the resulting compiled code is stored (SPE Code 190) in code section 250 of logical program partition 225. On the other hand, if the code section is not compiled for the second environment, then decision 650 branches to "no" branch 665 bypassing step 660. Returning to decision 630, if the selected code section is not being compiled for the first environment, then decision 630 branches to "no" branch 645 branching to the compilation step for the second environment (step 660), since the code section needs to be compiled for at least one of the environments. In this example we show one general purpose processor and one type of application specific processor, but one culd envision multiple types of application specific accelerators.

At step 670, acceptable performance thresholds are set based upon the analysis performed in step 615. In addition, the initial environment (e.g., PPE or SPE) is set in which the partition will execute. The initial environment is also based upon the analysis performed in step 615, as well as environment limitations that may necessitate a particular code section to execute in a particular environment despite the analysis results. A determination is made as to whether there are more code sections to compile (decision 675). If there are more code sections to compile, decision 675 branches to "yes" branch 680 whereupon, at step 685, the next code section is selected from source code 610 and processing loops back to process (compile) the newly selected code section. This looping continues until there are no more code sections to compile, at which point decision 675 branches to "no" branch 690 and compiler processing ends at 695.

Figure 7:
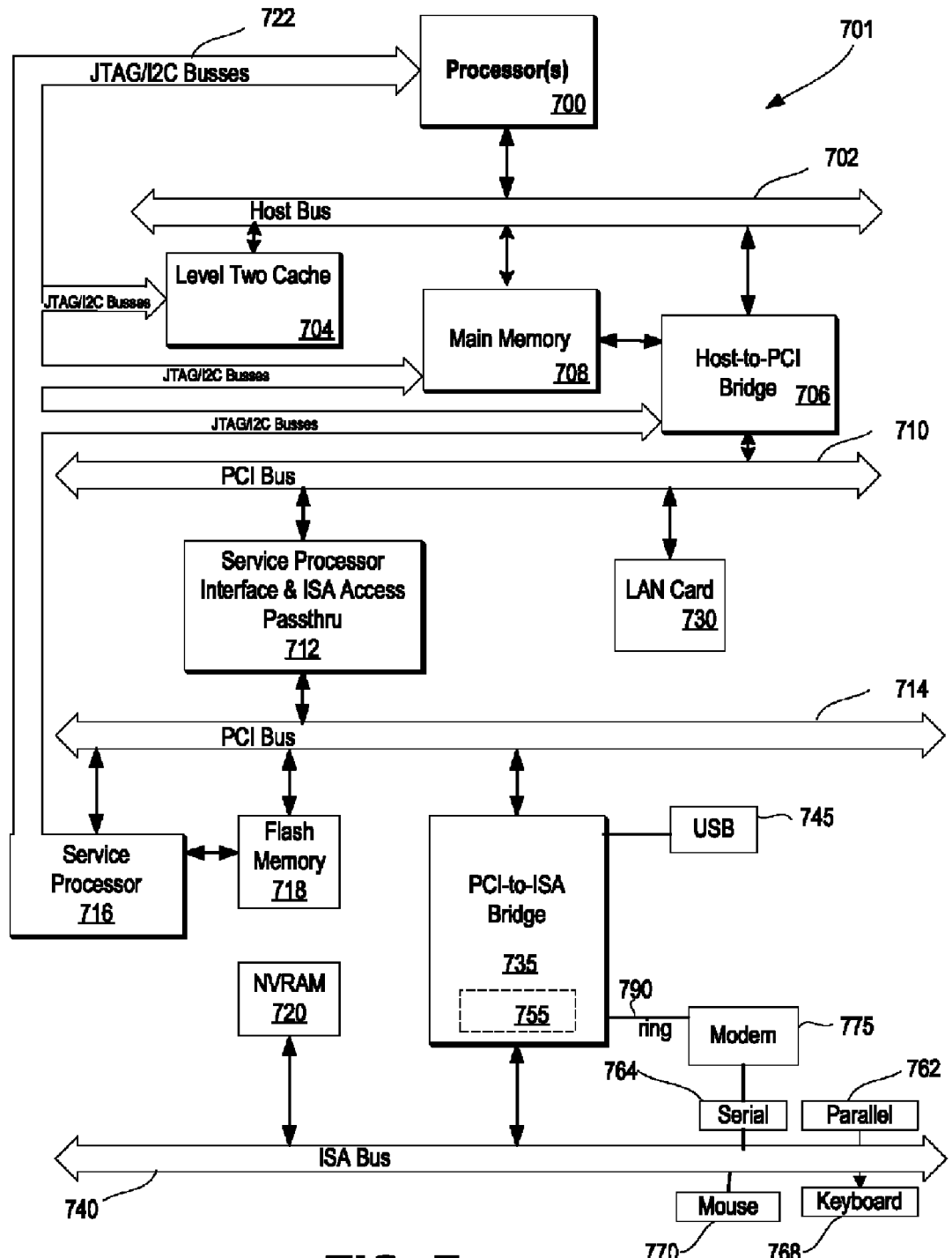
FIG. 7 is a block diagram of a traditional information handling system in which the present invention can be implemented.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

FIG. 8 is a block diagram illustrating a processing element having a main processor and a plurality of secondary processors (The SPE is an example of a particular type of secondary processor) sharing a system memory. FIG. 8 depicts a heterogeneous processing environment that can be used to implement the present invention. Primary Processor Element (PPE) 805 includes processing unit (PU) 810, which, in one embodiment, acts as the main processor and runs an operating system. Processing unit 810 may be, for example, a Power PC core executing a Linux operating system. PPE 805 also includes a plurality of synergistic processing elements (SPEs) such as SPEs 845, 865, and 885. The SPEs include synergistic processing units (SPUs) that act as secondary processing units to PU 810, a memory storage unit, and local storage. For example, SPE 845 includes SPU 860, MMU 855, and local storage 859; SPE 865 includes SPU 870, MMU 875, and local storage 879; and SPE 885 includes SPU 890, MMU 895, and local storage 899.

All SPEs may use the same ISA, or may each implement an application specific ISA. Each SPE may be configured to perform a different task, and accordingly, in one embodiment, each SPE may be accessed using different instruction sets. If PPE 805 is being used in a wireless communications system, for example, each SPE may be responsible for separate processing tasks, such as modulation, chip rate processing, encoding, network interfacing, etc. In another embodiment, the SPEs may have identical instruction sets and may be used in parallel with each other to perform operations benefiting from parallel processing.

PPE 805 may also include level 2 cache, such as L2 cache 815, for the use of PU 810. In addition, PPE 805 includes system memory 820, which is shared between PU 810 and the SPUs. System memory 820 may store, for example, an image of the running operating system (which may include the kernel), device drivers, I/O configuration, etc., executing applications, as well as other data. System memory 820 includes the local storage units of one or more of the SPEs, which are mapped to a region of system memory 820. For example, local storage 859 may be mapped to mapped region 835, local storage 879 may be mapped to mapped region 840, and local storage 899 may be mapped to mapped region 842. PU 810 and the SPEs communicate with each other and system memory 820 through bus 817 that is configured to pass data between these devices.

The MMUs are responsible for transferring data between an SPU's local store and the system memory. In one embodiment, an MMU includes a direct memory access (DMA) controller configured to perform this function. PU 810 may program the MMUs to control which memory regions are available to each of the MMUs. By changing the mapping available to each of the MMUs, the PU may control which SPU has access to which region of system memory 820. In this manner, the PU may, for example, designate regions of the system memory as private for the exclusive use of a particular SPU. In one embodiment, the SPUs' local stores may be accessed by PU 810 as well as by the other SPUs using the memory map. In one embodiment, PU 810 manages the memory map for the common system memory 820 for all the SPUs. The memory map table may include PU 810's L2 Cache 815, system memory 820, as well as the SPUs' shared local stores.

In one embodiment, the SPUs process data under the control of PU 810. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 810 and by the other SPUs. An SPU may reserve part of its local store in order for the SPU to have fast, guaranteed memory access when performing tasks that require such fast access. The SPU may also reserve some of its local store as private when processing sensitive data, as is the case, for example, when the SPU is performing encryption/decryption.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
   compiling a source code program into a logical program partition that includes a plurality of binary representations that are each executable code, wherein one or more of the plurality of binary representations are compiled to execute on one or more general purpose processors utilizing a first instruction set architecture (ISA) and wherein one or more of the plurality of binary representations are compiled to execute on one or more types of application specific processors that utilize one or more second ISAs;
   including one or more sets of acceptable performance threshold data corresponding to one or more of the binary representations in the logical program partition;
   packaging the logical program partition and an execution monitor into a logical program package;
   initiating execution of the logical program package on one of the general purpose processors, the initiating including:
      executing a first binary representation selected from the plurality of binary representations that is compiled to execute on the general purpose processor; and
      executing the execution monitor that monitors the first binary representation using the acceptable performance threshold data that corresponds to the first binary representation;
   determining, by the execution monitor, that the performance of the first binary representation has fallen below the acceptable performance threshold data corresponding to the first binary representation;
   in response to the determination, selecting a second binary representation from the plurality of binary representations that has been compiled to execute on one of the application specific processors; and
   executing the second binary representation on one of the application specific processors.

2. The computer implemented method of claim 1 further comprising: transferring control from the first binary representation to the second binary representation, wherein a partition manager executes to effect the transfer.

3. The computer implemented method of claim 1 further comprising: transferring local data maintained by the first binary representation to the second binary representation, the transferring including:
   writing the local data from the first binary representation to a shared memory area accessible by both the general purpose processor and the application specific processors; and
   reading, by the second binary representation, the local data from the shared memory area.

4. The computer implemented method of claim 3 wherein at least one of the local data is a pointer that addresses data in the shared memory area.

5. The computer implemented method of claim 3 further comprising: after the transferring:
   ceasing execution of the first binary representation; and
   reclaiming memory used by the first binary representation.

6. The computer implemented method of claim 1 wherein the second binary representation is selected from more than one binary representations that have been compiled to execute on the application specific processor, wherein at least one of the binary representations has corresponding acceptable performance threshold data and wherein at least one of the binary representations does not have corresponding acceptable performance threshold data, the method further comprising:
   selecting, by the execution monitor, the second binary representation from the more than one binary representations, the selection including consideration of whether the second binary representation has corresponding acceptable performance data.

7. The computer implemented method of claim 1 further comprising:
   identifying a logical program package deficiency where none of the plurality of binary representations were compiled to execute on the application specific processors included in a computer system that is executing the first binary representation; in response to identifying the logical program package deficiency, dynamically creating a second binary representation executable by one of the application specific processors included in the computer system;

determining, by the execution monitor, that the performance of the first binary representation has fallen below the acceptable performance threshold data that corresponds to the first binary representation;

in response to the determination, executing the second binary representation; and transferring local data maintained by the first binary representation to the second binary representation, the transferring including:

writing the local data from the first binary representation to a shared memory area accessible by both the general purpose processor and the application specific processors; and reading, by the second binary representation, the local data from the shared memory area.

8. An information handling system comprising:

a plurality of heterogeneous processors, wherein the plurality of heterogeneous processors includes a first processor type that utilizes a first instruction set architecture (ISA) and a second processor type that utilizes a second instruction set architecture (ISA);

a local memory corresponding to each of the plurality of heterogeneous processors; a shared memory accessible by the heterogeneous processors;

one or more nonvolatile storage devices accessible by the heterogeneous processors; and a set of instructions stored in one of the local memories, wherein one or more of the heterogeneous processors executes the set of instructions in order to perform actions of:

initiating execution of a logical program package on one of the general purpose processors, wherein the logical program package includes:

at least one logical program partition that includes a plurality of binary representations that are each executable code, wherein one or more of the plurality of binary representations are compiled to execute on the first processor type and wherein one or more of the plurality of binary representations are compiled to execute on the second processor type;

one or more sets of acceptable performance threshold data corresponding to one or more of the binary representations in the logical program partition; and an execution monitor;

the initiating including:

executing a first binary representation selected from the plurality of binary representations, wherein the first binary representation is compiled to execute on the first processor type; and executing the execution monitor that monitors the first binary representation using the acceptable performance threshold data that corresponds to the first binary representation; determining, by the execution monitor, that the performance of the first binary representation has fallen below the acceptable performance threshold data corresponding to the first binary representation;

in response to the determination, selecting a second binary representation from the plurality of binary representations that has been compiled to execute on one of the application specific processors; and executing the second binary representation on one of the application specific processors.

9. The information handling system of claim 8 further comprising instructions that perform the actions of: transferring control from the first binary representation to the second binary representation, wherein a partition manager executes to effect the transfer.

10. The information handling system of claim 8 further comprising instructions that perform the actions of:

transferring local data maintained by the first binary representation to the second binary representation, the transferring including:

writing the local data from the first binary representation to the shared memory; and reading, by the second binary representation, the local data from the shared memory area.

11. The information handling system of claim 8 further comprising instructions that perform the actions of:

identifying a logical program package deficiency where none of the plurality of binary representations were compiled to execute on the second processor types included in the information handling system;

in response to identifying the logical program package deficiency, dynamically creating a second binary representation executable by one of the second processor types;

determining, by the execution monitor, that the performance of the first binary representation has fallen below the acceptable performance threshold data that corresponds to the first binary representation;

in response to the determination, executing the second binary representation; and transferring local data maintained by the first binary representation to the second binary representation, the transferring including:

writing the local data from the first binary representation to a shared memory area accessible by both the general purpose processor and the application specific processors; and reading, by the second binary representation, the local data from the shared memory area.

12. A computer program product stored in a non-transitory computer-readable medium, comprising functional descriptive material that, when executed by an information handling system, causes the information handling system to perform actions that include:

initiating execution of a logical program package that includes one or more logical program partitions, wherein at least one of the partitions includes a plurality of binary representations that are each executable code, wherein at least one of the plurality of binary representations has been compiled to execute on a general purpose processor utilizing a first instruction set architecture and at least one of the plurality of binary representations has been compiled to execute on one or more types of application specific processors that utilize one or more second ISAs that are different from the first ISA, wherein the initiating includes:

executing a first binary representation selected from the plurality of binary representations, wherein the first binary representation is compiled to execute on the general purpose processor; and monitoring execution of the first binary representation using an execution monitor that compares performance of the executing binary representation to a first set of one or more sets of acceptable performance threshold data, wherein the first set of acceptable performance threshold data corresponds to the first binary representation, and wherein the plurality of sets and the execution monitor are included in the logical program package;

determining, by the execution monitor, that the performance of the first binary representation has fallen below the acceptable performance threshold data that corresponds to the first binary representation;

in response to the determination, selecting a second binary representation from the plurality of binary representations, wherein the second binary representation has been compiled to execute on one of the application specific processors; and executing the second binary representation on one of the application specific processors.

13. The computer program product of claim 12 further comprising functional descriptive material that, when executed by an information handling system, causes the information handling system to perform actions that include:

transferring control from the first binary representation to the second binary representation, wherein a partition manager executes to effect the transfer.

14. The computer program product of claim 13 further comprising functional descriptive material that, when executed by an information handling system, causes the information handling system to perform actions that include:

transferring local data maintained by the first binary representation to the second binary representation, the transferring including:

writing the local data from the first binary representation to a shared memory area accessible by both the general purpose processor and the application specific processors; and reading, by the second binary representation, the local data from the shared memory area.

15. The computer program product of claim 14 wherein at least one of the local data is a pointer that addresses data in the shared memory area.

16. The computer program product of claim 14 further comprising functional descriptive material that, when executed by an information handling system, causes the information handling system to perform actions that include: after the transferring:

ceasing execution of the first binary representation; and reclaiming memory used by the first binary representation.

* * * * *